United States Patent [19]
Noel

[11] Patent Number: 5,496,391
[45] Date of Patent: Mar. 5, 1996

[54] MATERIAL AND A METHOD FOR FORMING A PROTECTIVE COATING ON A SUBSTRATE OF A COPPER-BASED ALLOY

[75] Inventor: Léon Noel, Viroflay, France

[73] Assignee: Castolin S.A., Saint-Sulpice, Switzerland

[21] Appl. No.: 285,032

[22] Filed: Aug. 2, 1994

[30] Foreign Application Priority Data

Dec. 4, 1992 [FR] France .................................. 92 14653

[51] Int. Cl.$^6$ ..................................................... C22C 19/03
[52] U.S. Cl. ............................. 75/255; 75/331; 420/452; 420/458
[58] Field of Search ..................... 75/255, 331; 420/442, 420/452, 457, 458

[56] References Cited

U.S. PATENT DOCUMENTS

| | | | |
|---|---|---|---|
| 3,437,480 | 4/1969 | Cape | 420/442 |
| 4,724,188 | 2/1988 | Saito et al. | 420/457 |

FOREIGN PATENT DOCUMENTS

| | | | |
|---|---|---|---|
| 58-181843 | 10/1983 | Japan | 420/442 |

*Primary Examiner*—George Wyszomierski
*Attorney, Agent, or Firm*—Hopgood, Calimafde, Kalil & Judlowe

[57] ABSTRACT

A powdered metallic coating material is disclosed, having the following composition (in weight percent):

| | |
|---|---|
| Cu: | 5–30 |
| P: | 0.1–4.0 |
| B: | 0.5–4.0 |
| Si: | 0.5–4.0 |
| Cr: | 0–5.0 |
| Fe: | 0–3.0 |
| C: | 0–0.3 |
| Ni: | balance |

This material is used for forming, by thermal spraying, plasma arc welding or brazing, a protective coating against high temperature corrosion and erosion, on a substrate made of a copper based alloy. A flux composition or a mixture of such a composition with an alloy containing phosphorus is applied first on the surface of the substrate, and said powdered metallic material is then applied thereupon.

Improved adherence of the coating to the substrate, as well as better compactness and machinability properties of this coating are achieved.

8 Claims, No Drawings

MATERIAL AND A METHOD FOR FORMING A PROTECTIVE COATING ON A SUBSTRATE OF A COPPER-BASED ALLOY

The present invention is concerned with the forming of a protective coating against high temperature corrosion and erosion, on a substrate made of a copper based alloy, by thermal spraying, plasma arc welding or brazing of a metallic material on this substrate.

The benefits are already recognized, of forming, on the surface of a copper based alloy substrate further containing at least one of the following metals, aluminium, zinc, tin and nickel, and in particular on the surface of glassmolds made of a copper-aluminium alloy known as "aluminum bronze", a protective coating against high temperature corrosion and erosion, through the application of a coating material consisting essentially of a hard alloy resisting to high temperature corrosion and abrasion, or capable of forming such an alloy, this alloy being in particular of the nickel-boron-silicon type or of the nickel-chromium-boron-silicon type.

However, the attempts made in this direction have failed or yielded results which were poor, which seemed to be due to the fact that the oxidation of copper and of the other components of the substrate, during the application of the coating material on the substrate, brings about a poor wettability of the latter by the metallic coating material, making it very difficult, if not impossible, to obtain a good bonding of the coating to the substrate. Further, a deterioration is noted both in the compactness of the coating and in its machinability, which also seems to result from the forming of copper oxide at the interface between the substrate and the coating material.

Attempts have been made to find a solution to this problem through the use of flux compositions aimed at improving the wettability of the substrate by the coating material. However, up to now, such attempts have always failed, in particular in the case when the substrate consists of a copper alloy containing aluminum, such as those normally used presently for the manufacture of glass moulds, in which the sharp edges are especially prone to wear and to erosion upon contact with the molten glass.

The drawbacks arising from the above mentioned problem are all the more marked as the melting points or ranges of the metallic materials which have been tentatively used up to now for forming a protective coating on the copper based alloy substrate, exhibit only a small difference with those of the latter alloys. Consequently, upon application of these metallic materials on these substrates, the latter are unavoidably brought to temperatures close to their melting range, which can result in their deforming and by all means stimulates the forming and the diffusion of copper oxides towards the superficial parts of the substrate.

The invention is aimed at eliminating the above mentioned drawbacks.

Accordingly, the object of the invention is a metallic coating material for forming through thermal spraying, plasma arc welding or brazing, a protective coating against high temperature corrosion and erosion, on a substrate of a copper based alloy, this coating material having a composition comprised within the following limits (in weight percent):

| | |
|---|---|
| Cu | 5–30 |
| P | 0.1–4.0 |
| B | 0.5–4.0 |
| Si | 0.5–4.0 |
| Cr | 0–5.0 |
| Fe | 0–3.0 |
| C | 0–0.3 |
| Ni | balance |

A composition range which is particularly advantageous and within the above mentioned limits corresponds to the following narrower limits (in weight percent):

| | |
|---|---|
| Cu | 8.0–20.0 |
| P | 0.5–2.5 |
| B | 0.8–3.0 |
| Si | 1.0–3.5 |
| Cr | 0–2.0 |
| Fe | 0–2.0 |
| C | 0–0.2 |
| Ni | balance | and an even more advantageous composition range corresponds to the following limits (in weight percent):

| | |
|---|---|
| Cu | 12–15 |
| P | 1–2 |
| B | 1.2–1.7 |
| Si | 2.0–2.5 |
| Cr | 0–0.5 |
| Fe | 0–1.0 |
| C | 0–0.1 |
| Ni | balance |

Advantageously, this metallic coating material consists of an alloy or of a mixture of at least two powders of metallic alloy.

Advantageously, the material is in the form of particles consisting each one of an agglomerate of at least two powders of metallic alloy.

In accordance with one embodiment which is particularly advantageous, this material consists of a mixture of a powder of a nickel-phosphorus alloy and of a powder of an alloy selected from nickel-boron-silicon alloys and from nickel-chromium-boron-silicon alloys.

In accordance with another embodiment which is advantageous, the material consists of a mixture of a powder of a nickel-chromium-phosphorus alloy and of a powder of an alloy selected from nickel-boron-silicon alloys and from nickel-chromium-boron-silicon alloys.

Advantageously, the material can also consist of a mixture of a powder of a copper-phosphorus alloy and of a powder of an alloy selected from nickel-boron-silicon alloys and from nickel-chromium-boron-silicon alloys.

The invention is also concerned with a manufacturing method for the coating material which has just been described. This method is characterized in that said metal alloys are prepared separately in the form of molten masses, from their constituent elements and/or from alloys containing these elements, the alloys thus obtained are then solidified and converted into a powdered form, and finally the powders thus formed are mixed together.

According to one mode of carrying out the method which is particularly advantageous, the alloys are converted into a powdered form by crushing and/or grinding of the solid alloy masses resulting from the solidification of the respective molten alloys.

According to another embodiment which is advantageous, the alloys can be converted into a powdered form by atomizing and cooling, directly from the molten state. To this end, one can use in particular an atomizing and cooling installation, wherein in a manner known per se, a molten alloy is atomized as fine droplets by means of nozzles and these droplets are immediately subjected to a rapid cooling, so as to solidify them.

According to a manufacturing method of the material which is particularly advantageous in the case of the latter consisting of a single alloy, said alloy is prepared in the form of a molten mass from its constituent elements and/or from alloys containing these elements and then the alloy thus obtained is solidified and converted into a powdered form.

To this end, one can advantageously convert the alloy into a powdered form by crushing and/or grinding of at least one mass of a solid alloy resulting from the solidification of the alloy, or further one can convert the alloy into a powdered form from the molten state by atomizing and cooling.

In accordance with another embodiment which is advantageous, at least two metallic alloy powders are prepared separately according to one of the methods set forth above and the particles are formed, each consisting of an agglomerate of at least two of the metallic alloy powders thus prepared.

The invention is equally concerned with a method for the forming of a protective coating against high temperature corrosion and erosion, on a substrate of a copper based alloy, by thermal spraying, plasma arc welding or brazing of a metallic material based on nickel and containing boron and silicon, according to which at least one intermediate layer containing flux composition and a material containing phosphorus is applied on the substrate and in that the metallic coating material is applied upon this layer.

According to a preferred mode of carrying out this method, the metallic coating material used is a material of which the composition is indicated above.

According to another mode of carrying out this method, the metallic coating material used is selected from nickel-boron-silicon alloys and from nickel-chromium, boron-silicon alloys.

According to the present method, an application is preferably carried out on the substrate, of a mixture of flux composition and of at least one material containing phosphorus or, on the one hand, of at least one layer of the material containing phosphorus and, on the other hand, of at least one layer of the flux composition or of a mixture of the flux composition with this material containing phosphorus.

Advantageously, said material containing phosphorus contains at least one metallic alloy containing phosphorus in the form of an allied element, or this material consists of at least one such an alloy.

Preferably, the proportion of said metallic alloy containing phosphorus used in mixture or in association with said flux composition is of about 20 to 80 weight percent and more particularly of 30 to 70 weight percent of the total weight of this alloy and this composition.

Advantageously, the particle size of said metallic alloy is of $-150/+5$ micrometers and preferably of $-100/+5$ micrometers. Advantageously, said metallic alloy containing phosphorus is selected from nickel-phosphorus alloys having a phosphorus content of 8 to 15 weight percent and preferably of 9 to 13 weight percent, from copper-phosphorus alloys having a phosphorus content of 2 to 10 weight percent and preferably of 3 to 8 weight percent and from nickel-chromium-phosphorus alloys having a phosphorus content of 7 to 15 weight percent and preferably of 8 to 13 weight percent.

Advantageously, a flux composition is used which is of a type known per se, consisting essentially of compounds, in particular of salts, of potassium, boron and fluor and also containing chlorides.

Advantageously, in the case where a mixture of a flux composition and of a powdered metallic alloy is used, this mixture is in the form of grains each consisting of an agglomerate of particles of this composition and of this alloy.

Advantageously, the application of said flux composition is carried out by using this composition in the form of a paste.

Advantageously, the application of powdered metallic coating material is carried out by an autogenous thermal spraying process with simultaneous melting of this material, at least on the major part of the substrate surface coated with said flux composition, said mixture or said layers of this composition or this mixture and the material containing phosphorus.

According to still another mode of carrying out the method which is particularly advantageous, the powdered metallic coating material is applied by thermal spraying by means of a plasma torch or by plasma arc welding, on at least the major part of the surface of the substrate previously coated with said flux composition or said mixture, or of distinct layers of this composition or of this mixture and of said material containing phosphorus.

The invention is in particular directed to the use of the method which has just been described, for forming a protective layer against high temperature corrosion and erosion, on a metal part made of a copper based alloy containing at least one of the following additional alloying elements: aluminum, zinc, tin and nickel.

More particularly, the invention is concerned with the use of this method for forming a protective layer on at least one part of the inner wall of a glass mould made of a copper-aliminum bronze containing nickel and zinc as alloying elements.

Although the phenomena which take place during the forming of a protective coating by a process according to the invention have not been fully elucidated at the present time and although, by all means, the scope of the invention is in no way limited by the nature of these phenomena, it seems possible to explain, at least partly, the beneficial effects brought about by the invention, by the fact that the phosphorus present in the coating material and/or in the material used in mixture or in association with the flux composition, undergoes an oxidation by reaction with at least one part of the copper oxide and possibly with other metal oxides also present in the superficial region of the substrate, the phosphorus compounds thus formed and in particular phosphorus pentoxide and phosphoric acid providing flux properties or a fluxing action, or forming a material which is self-melting with respect to these metal oxides. Thus, the wettability of the substrate for the coating material is considerably improved.

The result is that the protective coating finally obtained according to the invention is much better bonded to the substrate than in the case of the previous attempts made according to prior techniques. Furthermore, one finds that said coating also exhibits considerably improved compactness and machinability properties, by comparison to those of coatings obtained according to prior art.

The invention makes it possible to obtain excellent results in particular regarding both the quality of the bonding between the protective coating and the substrate, and the compactness and machinability properties of the protective coating, in particular in the case of a substrate consisting of a copper-aluminum alloy of the type usually known as "aluminum bronze" having a composition comprised within the following limits (in weight percent):

| Al | 0.1–15 |
|---|---|
| Ni | 0–12 |
| Zn | 0–12 |
| Cu | balance |

The following non limiting examples illustrate embodiments of the invention.

EXAMPLE 1

In order to protect against wear, in particular the edges of glass moulds made of aluminum bronze having the following composition (expressed in weight percent):

| Al | 6–9 |
|---|---|
| Ni | 9–12 |
| Zn | 9–12 |
| Cu | balance | one proceeds as follows:

After the mechanical cleaning and the careful degreasing of the surface to be coated, an application is carried out on this surface at room temperature, of a thin layer of a paste consisting of a mixture containing 40 weight percent of a flux composition of a known type comprised of compounds of potassium and of boron as well as of fluorides and 60 weight percent of a powder of a nickel-phosphorus alloy containing 11 weight percent phosphorus.

Each mould is subsequently rapidly preheated in such a manner that the entire mould be brought to a temperature of 600° C., without any part of the inner surface of the mould exceeding this temperature, and then a spraying torch with an autogenous flame is used for spraying on the parts of the inner surface of the mould coated with the layer of flux paste, a powder of the coating material consisting of particles of alloy having the following composition (in weight percent):

| Si | 2.2 |
|---|---|
| B | 1.3 |
| Cu | 13.5 |
| Fe | 0.34 |
| Cr | 0.08 |
| C | 0.08 |
| P | 1.5 |
| Ni | balance |

The application is carried out to the desired thickness with the simultaneous melting of the coating material, the spraying being started at the bulkiest portions of the part.

During the spraying operation, the copper oxides formed due to the heating of the substrate are dissolved as they form, by the simultaneous action of the conventional flux composition and of the oxidation products of phosphorus present in the metallic powdered coating alloy and the surface of the substrate is thus wetted by the liquid mass produced by the fusion of the flux composition and of the metallic coating alloy.

After cooling and solidification of the coating, the thickness of the protective layer is machined back to a thickness of about 2 mm.

It was found that a dense homogeneous coating is thus obtained which adheres perfectly to the substrate and the hardness of which is between 350 and 400 Hv.

EXAMPLE 2

In order to increase the service life of a contact surface of a press for the pressure welding of sheets of plastic material, a protective coating made of a nickel-chromium alloy which is resistant to wear is applied on this surface.

The substrate consists of an aluminum bronze having the following composition (in weight percent):

| Al | 9.0–12.0 |
|---|---|
| Ni | 2.0–3.0 |
| Cu | balance |

Spraying according to a procedure similar to that described in Example 1, is carried out on the substrate, of a metallic coating alloy having the following composition (expressed in weight percent):

| Cu | 10 |
|---|---|
| P | 3.5 |
| B | 1.6 |
| Si | 2 |
| Cr | 4.5 |
| Fe | 1.5 |
| C | 0.2 |
| Ni | balance |

Before the thermal spraying of the powder of coating alloy on the substrate, an application is carried out on the latter at room temperature, of a pasty mixture comprised of 70 weight percent of the same flux composition as that indicated in Example 1 and of 30 weight percent of a powder of a copper-phosphorus alloy containing 6 weight percent of phosphorus, and having particles less than 100 microns in size.

A compact homogeneous protective coating is thus obtained which adheres perfectly to the substrate.

I claim:

1. A powdered metallic material for forming a protective coating for use against high temperature corrosion and erosion on an alloy substrate based on copper, characterized in that the powdered metallic material is selected from at least one of the group consisting of:

| (1) | Cu: | 5–30 |
|---|---|---|
|  | P: | 0.1–4.0 |
|  | B: | 0.5–4.0 |
|  | Si: | 0.5–4.0 |
|  | Cr: | 0–5.0 |
|  | Fe: | 0–3.0 |
|  | C: | 0–0.3 |
|  | Ni: | substantially the balance |
| (2) | Cu: | 8.0–20.0 |
|  | P: | 0.5–2.5 |
|  | B: | 0.8–3.0 |
|  | Si: | 1.0–3.5 |
|  | Cr: | 0–2.0 |
|  | Fe: | 0–2.0 |
|  | C: | 0–0.2 |
|  | Ni: | substantially the balance |
| (3) | Cu: | 12.0–15 |
|  | P: | 1–2 |
|  | B: | 1.2–1.7 |
|  | Si: | 2.0–2.5 |
|  | Cr: | 0–0.5 |
|  | Fe: | 0–1.0 |
|  | C: | 0–0.1 |
|  | Ni: | substantially the balance | said selected material characterized in that it is a mixture of a powdered alloy selected from the group consisting of nickel-phosphorous alloys, nickel-chromium-phosphorus alloys, and copper phosphorus alloys, with a powdered alloy selected from the group consisting of nickel-boron-silicon alloys and nickel-chromium-boron-silicon alloys.

2. A material according to claim 1, characterized in that one of said powdered alloys is selected from the group consisting of a nickel-phosphorus alloy having a phosphorus content of about 8 to 15 weight percent, a nickel-chromium-phosphorus alloy having a phosphorus content of about 7 to 15 weight percent, and a copper-phosphorus alloy having a phosphorus content of about 2 to 10 weight percent.

3. A material according to claim 2, characterized in that one of said powdered alloys is selected from the group consisting of a nickel-phosphorus alloy having a phosphorus content of about 9 to 13 weight percent, a nickel-chromium-phosphorus alloy having a phosphorus content of about 8 to 13 weight percent, and a copper-phosphorus alloy having a phosphorus content of about 3 to 8 weight percent.

4. A material according to claim 1, characterized in that at least two of the powdered alloys are in the form of agglomerates.

5. A method for the manufacture of a material according to claim 1, comprising preparing said metallic alloys separately in the form of molten masses, from their constituent elements and/or from alloys containing said elements, solidifying the alloys obtained and converting said solidified alloys into a powdered form, and mixing together the powders thus formed.

6. A method for the manufacture of a material according to claim 1, comprising preparing said alloy in the form of a molten mass from its constituent elements and/or from alloys containing these elements, then solidifying the molten mass and converting the alloy thus obtained into a powdered form.

7. A method according to claims 5 or 6 comprising converting the alloy or alloys into a powdered form by crushing and/or grinding of at least one solid mass of an alloy resulting from the solidification of the molten alloy or respective alloys.

8. A method according to claims 5 or 6 comprising converting the alloy or alloys into a powdered form by spraying and cooling directly from the molten state.

* * * * *

UNITED STATES PATENT AND TRADEMARK OFFICE
CERTIFICATE OF CORRECTION

PATENT NO. : 5,496,391
DATED : March 5, 1996
INVENTOR(S) : Noel Leon

It is certified that error appears in the above-indentified patent and that said Letters Patent is hereby corrected as shown below:

On the Title page, item [30] Foreign Application Priority Data;
    please insert the following information:

---PCT No. PCT/CH93/00272
         Dated: December 3, 1993 --.

Signed and Sealed this

Ninth Day of July, 1996

*Attest:*

BRUCE LEHMAN

*Attesting Officer*    *Commissioner of Patents and Trademarks*